United States Patent
Parry

[15] 3,687,392
[45] Aug. 29, 1972

[54] FARM MACHINE FOR REMOVING PROTECTIVE GROUND COVERS FROM A CULTIVATED FIELD

[72] Inventor: John R. Parry, Cinnaminson, N.J.
[73] Assignee: Campbell Soup Company, Camden, N.J.
[22] Filed: May 4, 1970
[21] Appl. No.: 34,410

[52] U.S. Cl. .............................................242/86.5 R
[51] Int. Cl. ...............................................B65h 75/40
[58] Field of Search.........242/86.5, 86.51, 86.52, 68, 242/68.4, 67.1

[56] References Cited

UNITED STATES PATENTS

| | | | |
|---|---|---|---|
| 2,325,805 | 8/1943 | Shoffner | 242/86.51 X |
| 2,664,253 | 12/1953 | Therrien | 242/86.5 |
| 3,481,556 | 12/1969 | McDonnell | 242/86.52 |

*Primary Examiner*—Stanley N. Gilreath
*Assistant Examiner*—Gregory A. Walter
*Attorney*—Howson & Howson

[57] ABSTRACT

A farm machine for removing protective ground covers in the form of long strips of generally uniform width from the surface of a cultivated field. The machine includes a frame carried across the field above a cover and a driven spool mounted transversely on the frame to progressively wind the cover into a roll as the machine advances. The spool is composed of a pair of generally vertical flanges opposingly mounted within the frame, the flanges being attached to the ends of a pair of cylindrical sleeves mounted in bearings on opposing sides of the frame, and a center shaft extending across the frame with ends in the sleeves. The shaft is composed of two abutting, interlocking sections which are prevented from separating in an axial direction by a pair of pins which extend through bores formed in each sleeve and shaft section outside of the bearings. When a single cover has been formed into a roll and is to be discharged from the machine, the pins are removed allowing the shaft sections to be separated and withdrawn in an axial direction through the sleeves causing the roll to drop to the ground.

8 Claims, 4 Drawing Figures

Patented Aug. 29, 1972

INVENTOR.
JOHN R. PARRY

BY

Harold A. O'Brien Jr.

ATTORNEY.

Patented Aug. 29, 1972
3,687,392
2 Sheets-Sheet 2
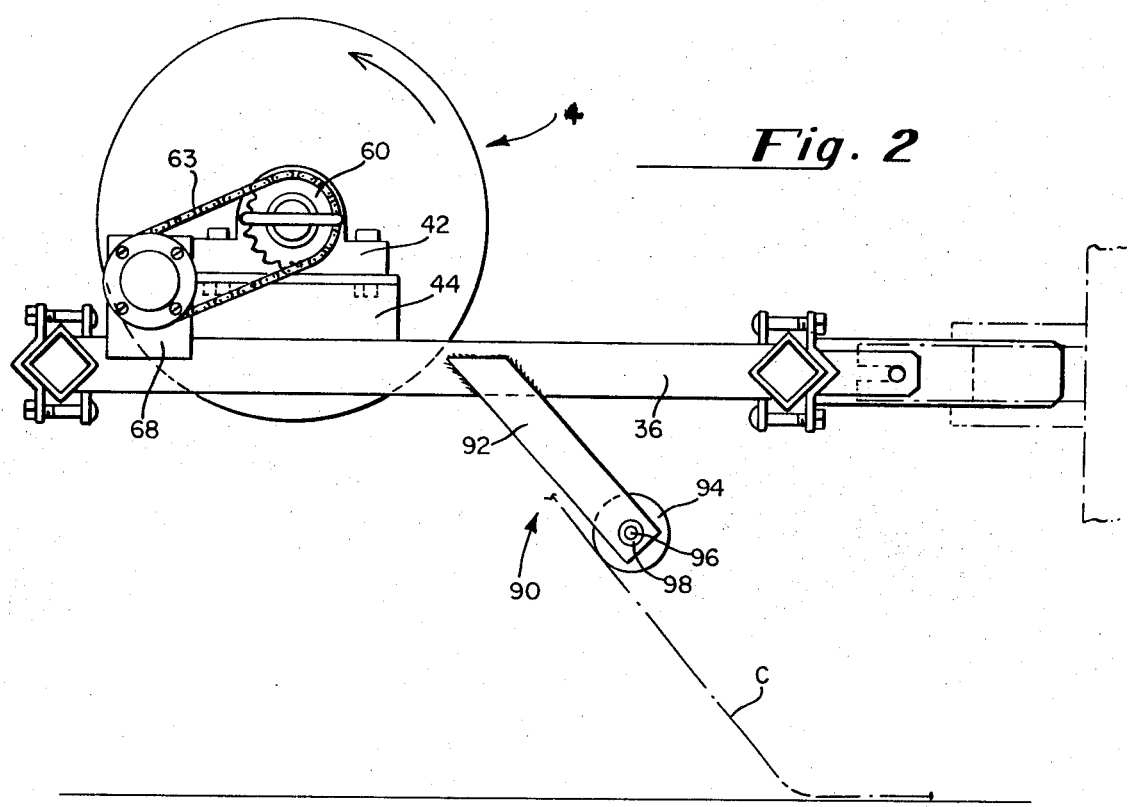
*Fig. 2*
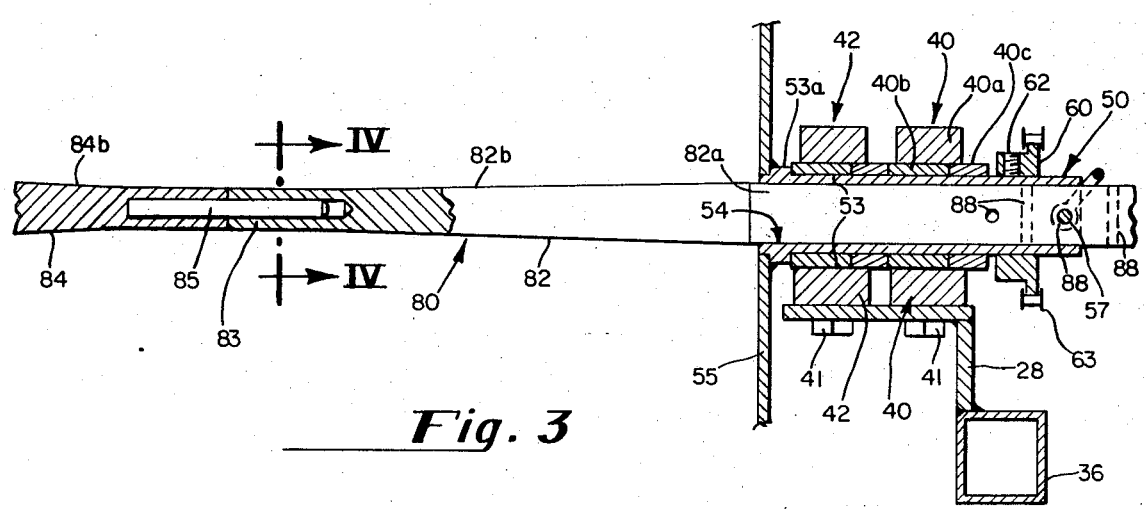
*Fig. 3*
*Fig. 4*
INVENTOR.
JOHN R. PARRY
BY
*Harold S. O'Brien Jr.*
ATTORNEY.

FARM MACHINE FOR REMOVING PROTECTIVE GROUND COVERS FROM A CULTIVATED FIELD

BACKGROUND OF THE INVENTION

This invention relates to farm machinery for removing from the surface of a cultivated field a ground cover or mulch strips made from plastic, paper, cloth, or the like, placed in the field to protect seeds and plants. In particular, this invention relates to a machine which moves across a field, pulls the cover from the earth, rolls it into a cylindrical roll and then drops the roll at a selected location before retrieving another strip.

Ground cover or mulch in the form of a sheet of material has been used for many years in the cultivation of various types of crops. It is often used to protect seeds, roots, and young plants against excess sun, rainfall, or low temperatures, as well as for the purpose of retarding the growth of weeds in the soil and in reducing moisture loss from the soil. To shield plants from too much sunlight or to retard weed growth, ground cover may be made from materials such as paper, dark plastic, or burlap; to trap the sun's heat in the soil and protect against low temperatures, the cover can be made out of a clear plastic. The covers vary in size and shape but they usually conform to the width of one or more furrows for convenience in handling and are frequently found in widths of about 30 inches and extend many hundreds of feet in length. The covers may be mechanically laid and anchored in the soil along the sides of the furrows as shown, for example, in patent application Ser. No. 781,911 filed on Dec. 6, 1968, now U.S. Pat. No. 3,559,599.

After a ground cover has laid in a field for several months, it often becomes tightly sealed in the soil and difficult to remove. Further, the cover must be removed in a manner which avoids damaging the growing plants or throwing loosened soil on the plants. Also, as soil and moisture adhere to the top surface of the covers, they frequently are heavy and difficult to handle. For these reasons, it has been found advantageous, when removing the cover, to roll it into a cylindrical roll rather than forming it into a rope or some other configuration.

SUMMARY OF THE INVENTION

Therefore, it is the primary object of this invention to provide a machine which is able to continuously extract a relatively long ground cover strip from a cultivated field without damaging the crops, form the cover into a compact cylindrical roll, and carry it to a location where it can readily be dropped from the machine for re-use or discard.

It is another object of this invention to provide a machine having, in addition to above advantages, means whereby the rolled-up strip may be quickly and easily removed from the machine by one or two attendants without the need for special tools or equipment.

It is another object of the invention to provide a machine having the above advantages which is relatively inexpensive to construct, easy to maintain and service, and one which may be mounted on or attached to the back of a common type of field tractor.

In summary, this invention relates to farm equipment useful in retrieving and removing relatively long, narrow covers from a cultivated field without damaging the crops by rolling the cover on a spool which advances across the field. The spool is constructed so that its center shaft separates allowing the shaft sections to be pulled outwardly thereby dropping the rolled-up cover from the machine at a location removed from the field. The spool can then be quickly reassembled to begin removing another cover strip from the field.

BRIEF DESCRIPTION OF THE DRAWINGS

This invention may be better understood by reference to the drawings included in this application, wherein:

FIG. 2 is a side elevational view of the apparatus shown in FIG. 1 as seen from the bottom of that figure;

FIG. 3 is a partial sectional view taken along the lines and arrows III-III of FIG. 1, and FIG. 4 is a sectional view taken along the lines and arrows IV—IV of FIG. 3.

DESCRIPTION OF THE PREFERRED EMBODIMENT

Figure 1:
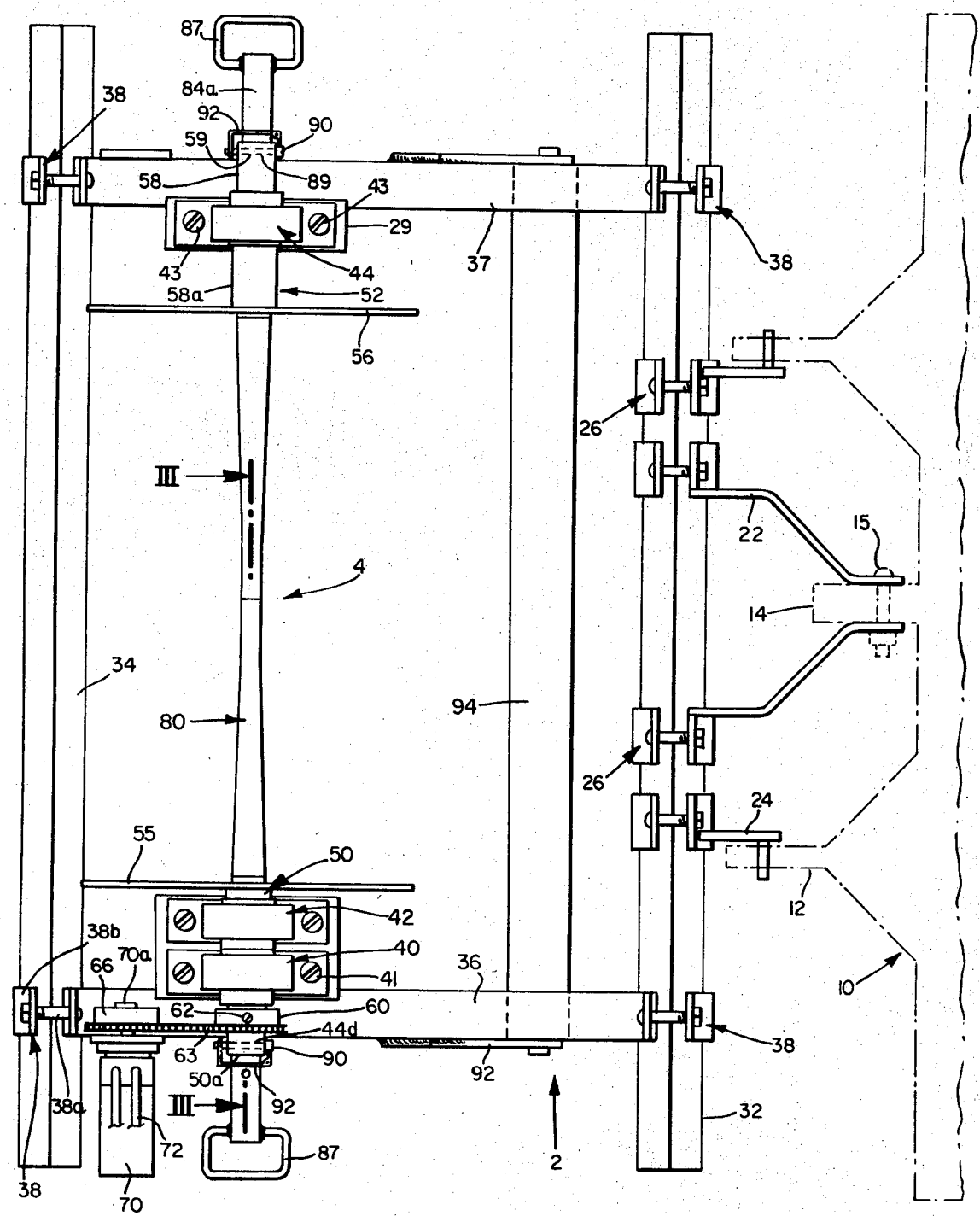
FIG. 1 is a plan view of the preferred form of the machine of this invention.

The preferred embodiment of the farm machine of this invention, shown initially in FIGS. 1 and 2, includes generally a rectangular frame 2 and a spool 4 mounted on the frame which, in this instance, is attached to and carried on the rear end of a field tractor (not shown) across a cultivated field in a direction to the right as the machine is shown in FIGS. 1 and 2. The rear end of the tractor is equipped with a standard 3-point hitch 10 (shown in broken lines) which includes a pair of rearwardly extending, lifting side arms 12 and a center post 14. The frame 2 is readily attached to and supported by hitch 10 by means of a center yoke 22 secured by a bolt 15 to tractor post 14 and a pair of laterally spaced supporting frame arms 24 fitting either through or within shaped receptacles (not shown) in the tractor arms 12.

Frame 2 includes a front transverse beam 32, a parallel, rear transverse beam 34 and a pair of parallel, spaced-apart connecting spacing beams (spacers) 36, 37. The beams and spacers are rigidly joined together near the corners by clamps 38, each of which includes a pair of bolts 38a and an angle iron 38b. Similar clamps 26 are used to attach the yoke 22 and the arms 24 to the front beam 32. The effective width of the frame may be varied by loosening the four corner clamps 38 and sliding spacers 36, 37 either outwardly or inwardly on the transverse beams 32, 34. This adjustment allows the machine to accommodate covers of different widths or even more than one cover on the spool 4 at one time.

A pair of sealed bearings 40, 42, also known commercially as "pillow blocks," are mounted adjacent to each other on and secured to an L-shaped flange 28 (FIG. 3) by two pairs of bolts 41, flange 28 being welded to the top of spacer 36. On the other spacer 37, a single bearing 44 of similar construction is mounted on flange 29 by bolts 43 so that the three bearings 40, 42, and 44 are aligned on a common axis transverse to the frame and parallel to beams 32, 34. The bearings are a commercially available item manufactured by the Boston Gear Company, and each includes (FIG. 3) a circular housing 40a, a bearing race 40b and a locking collar 40c with bearings (not shown) held between the race and housing. Preferably, the bearings are constructed so that the race 40b pivots through a limited arc in relation to the housing when the supported shaft pivots away from the horizontal plane. Although a single bearing may be placed on each side of the frame, two bearings on one side and one on the other are preferable for reasons to be explained herein below.

A pair of sleeves 50, 52, generally cylindrical in shape, are mounted within the bearings 40, 42, and 44 for rotation about a common axis generally transverse to frame 2. Sleeve 50, shown in FIG. 3 and at the bottom of FIG. 1, has a generally uniform diameter, axial bore 54 and a generally uniform outside diameter surface 53, except for an enlarged collar 53a which abuts bearing 42. Collar 53a prevents sleeve 50 from moving outwardly from the center of the frame and through the bearings. Sleeve surface 53 bears against and is supported by the bearing race 40b and the collar 40c of each bearing 40, 42. The sleeve is sufficiently long to extend through the bearings toward the outside of the frame and is equipped with a transverse bore 57 at a location proximate the end of the sleeve and outside of the bearings. A radial, generally vertical flange 55 is attached to the end of sleeve 50 inside of the bearings 40, 42 and spacer 36 and toward the center of the frame. The other sleeve 52 is similarly constructed (FIG. 1) and has a flange 56, a collar 58a, and an outside surface 58 which extends through the bearing 44. Sleeve 52 has a transverse bore 59 located proximate the end of the sleeve. Both sleeves 50, 52 are free to rotate within their respective bearings and are held from moving longitudinally or in an axial direction outwardly by collars 53a, 58a.

A driven sprocket 60 is mounted on sleeve 50 (FIG. 3) at a location outside of the bearing 40 and affixed to the sleeve by a set-screw 62. A drive chain 63 (FIGS. 1 and 2) connects the driven sprocket 60 with a driving sprocket 66 which is mounted on the shaft 70a of a hydraulic motor 70 supported by flange 68 on spacer 36. Hydraulic motor 70 is a commercially available item manufactured by the Charlynn Company. Motor 70 is driven by hydraulic fluid moving through the hoses 72 and the motor's speed of rotation and consequently that of chain 63 is controlled by a Vickers speed selector hydraulic valve located on the tractor.

A divided shaft 80 (shown in FIGS. 1 and 3) extends transversely across the frame and through the sleeves 52, 53 for rotation with the sleeves. Shaft 80, together with the sleeve flanges 55, 56 form the spool 4 upon which the ground cover is wound into generally a cylindrical roll. Shaft 80 is composed of two generally similar sections 82, 84 which, when the machine is retrieving a ground cover, abut each other and are interlocked near the center of the frame. Each shaft section 82, 84 has an outside portion 82a, 84a of uniform diameter which fits snugly within the sleeves and a tapered portion 82b, 84b which extends toward the center of the frame. The shaft sections connect in the center of the frame by means of a prong 85 extending from the end of section 84 and fitting into an axial bore 83 formed in the end of section 82. Both the prong and bore have rectangular cross sections, as shown in FIG. 4, so that when they are interlocked, the sections rotate as one unit. The shaft sections may be separated by moving one or both outwardly in an axial direction so that prong 85 is pulled out of bore 83. Each shaft section also has a series of transverse bores 88 formed in its outer end, the adjacent bores formed at right angles to each other, so that the shaft sections may be connected to the sleeves at any of several locations by a pair of locking pins 90. A handle 87 is attached to the end of each shaft section to facilitate handling the section.

A pair of locking pins 90, each having a latch 92, (FIGS. 1 and 3) pass through sleeve bore 57 and shaft section bore 88 on one side of the frame and sleeve bore 59 and shaft section bore 89 on the other side. When the pins are so placed, both shaft sections 82, 84 are connected to their respective sleeves 50, 52 which causes the shaft sections and sleeves to rotate together, and prevents the sections from pulling apart in the center or the sleeves moving inwardly in the bearings. When the pin latches 92 are freed and pins 90 extracted from the sleeves and shaft sections, the shaft sections 82, 84 may be pulled apart longitudinally by means of handles 87 to separate the sections and draw them through and out of their respective sleeves 50, 52. The sleeves then remain within the bearings on the frame.

A ground cover C take-up guide, generally referred to by numeral 90 as shown in FIG. 2, consists of a pair of forwardly inclined arms 92 fixedly attached to opposing locations on the spacers 36, 37, supporting a transverse roll 94 therebetween. The roll 94 has at either end an extending shaft 96 which fits within a bearing 98 mounted in the end of each arm 92 allowing the roll to freely rotate. Roll 94 rotates as it bears against the moving surface of cover C to guide the cover on the spool 4 and prevent it from fouling along the bottom of the preceding tractor.

The preferred embodiment of the machine of this invention operates substantially as follows. The tractor bearing the frame 2 is positioned at one end of the field above the end of a ground cover which is to be removed from the soil. The cover C, as shown in FIG. 2, is initially looped about the assembled shaft 80 by hand in a flat condition so that the cover will be rolled around the shaft as it rotates. The operator starts the tractor across the field holding the frame generally above the cover C and sets the hydraulic speed control valve to turn motor 70 at a selected speed. Motor 70 causes sprocket 66, chain 63 and sprocket 60 to rotate which, in turn, cause sleeve 50, both shaft sections 82, 84 and sleeve 52 to rotate in a counter-clockwise direction (FIG. 2) progressively winding cover C around shaft 80 and between flanges 55, 56. The speed of rotation of shaft 80 is varied by the tractor operator according to the speed of the tractor, the adherence of the soil to the cover and the increasing diameter of the roll. Roller 94 continues to press against the top surface of the cover C as it is pulled up from the soil. Clods of earth pulled up with the cover either fall off the sides of the cover or are lifted over the spool to be dropped back onto the field.

When the tractor reaches the end of furrow and the cover is completely wrapped around the spool, the operator drives to a location where the roll can be separated from the machine for storage and re-use or disposed of as waste. To separate the rolled-up cover from the machine, the operator removes pins 90 and pulls one or both shaft sections longitudinally by handles 53 sliding the sections out of the sleeves until the cover roll is no longer supported and it drops to the ground. The tapered shape of the shaft sections allow them to be easily withdrawn from the center of the cover roll. The double bearings 40, 42 supporting sleeve 50 allows a single operator to remove shaft section 84 first, while section 82 supports the entire weight of the cover roll, and then to remove section 82 to drop the roll. The shaft sections may then be reinserted through the sleeves so that prong 85 fits within bore 83, and, after the pins are reinserted, the machine is ready to begin to roll up another cover strip.

When a cover strip has a width larger than the distance between the flanges 55, 56 shown in the drawings, the effective width of the spool may be increased by removing pins 90, sliding the spacers 36, 37 outwardly on beams 32, 34 and then positioning the pins in the same sleeve bores but different shaft section bores. In this way, the shaft sections remain together in the center but are supported by the sleeves at different locations along their lengths. In a similar fashion, the spool may be reduced in size to accommodate a narrower cover.

Modifications in the preferred form of the machine disclosed will be readily apparent to those skilled in the art. For example, the frame may be supported on a separate axle and wheels and self-powered. Also, a keyway may be formed along the outside surface 53 of sleeve 50 to receive locking screw 62 to ensure sprocket 60 does not slip on sleeve 50. It is apparent, however, that all of these modifications are within the spirit of the invention.

I claim:

1. A farm machine for removing long, narrow ground covers from the surface of a cultivated field, the machine comprising: a supporting frame having two sides spaced apart at a distance at least as great as the width of the cover, said frame being capable of moving across the field so that the frame sides pass generally along and above the sides of the cover to be removed, a pair of sleeves mounted on opposing sides of the frame for rotation about a common axis located transverse to the direction of movement of the frame along the cover, each sleeve having a longitudinal bore and at least one sleeve being connected to a source of rotary motion, a shaft extending across the frame with ends supported within the sleeves to receive the cover between the frame sides and to wind it into a roll around the shaft as the frame advances, said shaft comprising two sections, means detachably securing said shaft sections together in axial alignment at a point intermediate said frame sides, and the ends of said shaft sections remote from said point of attachment extending through said sleeves, said shaft sections from said sleeves to the point of attachment being of lesser diameter than the bore of said sleeves, and means at each sleeve detachably securing said shaft sections to said sleeves so that when connected the sections rotate with the sleeves causing the cover to be progressively wound around the sections into a roll, and when the sleeves and sections are disconnected, each shaft section can be drawn longitudinally out its sleeve so that the cover roll becomes unsupported and drops from the machine.

2. The machine as defined in claim 6 further including,
a pair of radial flanges attached to the ends of the sleeves and located between the frame sides, the flanges being located in opposing spaced relationship so that as the cover is wound around the shaft sections it passes between the flanges.

3. The machine as defined in claim 2 wherein the means for detachably connecting each sleeve to a shaft section comprises a pin and aligned bores extending through the sleeve and the shaft section at a location outside of the bearings mounted on the frame, so that while a pin is in position extending through the aligned bores, the sleeve and shaft section rotate together and the shaft section is prevented from separating from the opposing shaft section and moving in a longitudinal direction through the sleeve.

4. The machine as defined in claim 3 further including a prong having a rectangular cross-section extending longitudinally from the end of one shaft section located between the frame sides and a correspondingly shaped bore formed within the end of the other shaft section located between the frame sides, whereby when the sections are joined together the prong extends into the bore causing the sections to rotate as one unit.

5. The machine as defined in claim 4 wherein each shaft section has a portion of generally uniform outside diameter and a portion of tapered outside diameter, said tapered portion extending a distance from the end which abuts the opposing section while the uniform diameter portion is located proximate the sleeve whereby the tapered portion allows the shaft section to be more easily withdrawn from the center of the cover roll.

6. The machine as defined in claim 5 further including a handle attached to the end of a shaft section located outside of a sleeve so that the section may be pulled in a longitudinal direction by means of the handle when the pin is removed.

7. The machine as defined in claim 6 further including a cover guide roll suspended below the shaft and extending between the frame sides, said cover being in contact with the cover guide roll as the cover is pulled from the soil to guide the cover into position to be wound on the shaft.

8. The machine as defined in claim 7 wherein the frame is provided with means for attaching it to the rear end of a tractor so that the frame is carried above the surface of the field.

* * * * *